Dec. 14, 1926.
W. DECKER
1,610,755
BRAKE FOR AUTOMOTIVE VEHICLES
Filed May 29, 1924     3 Sheets-Sheet 1
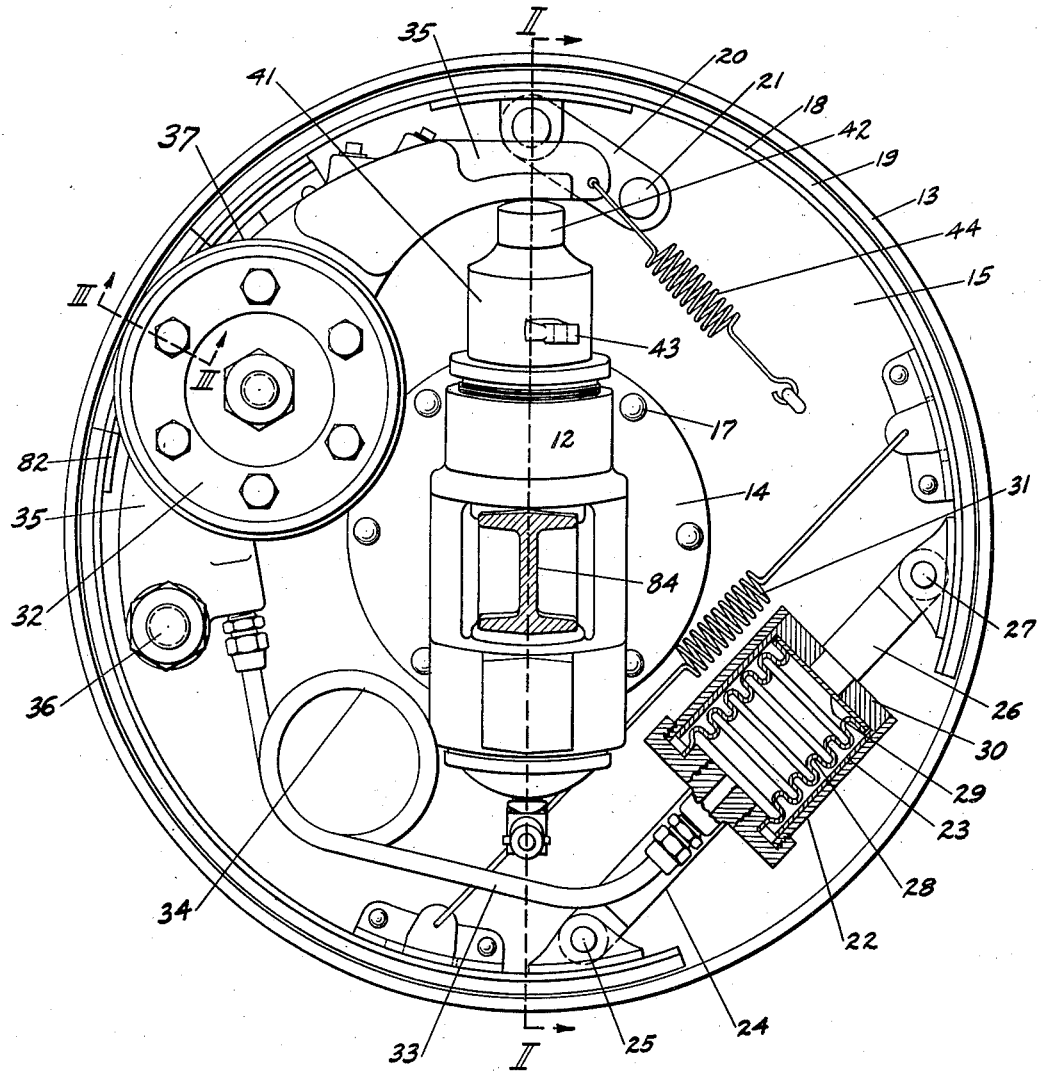
Fig. I
INVENTOR.
Ward Decker
BY Solon J. Boughton
ATTORNEY.

Dec. 14, 1926.
W. DECKER
1,610,755
BRAKE FOR AUTOMOTIVE VEHICLES
Filed May 29, 1924     3 Sheets-Sheet 2
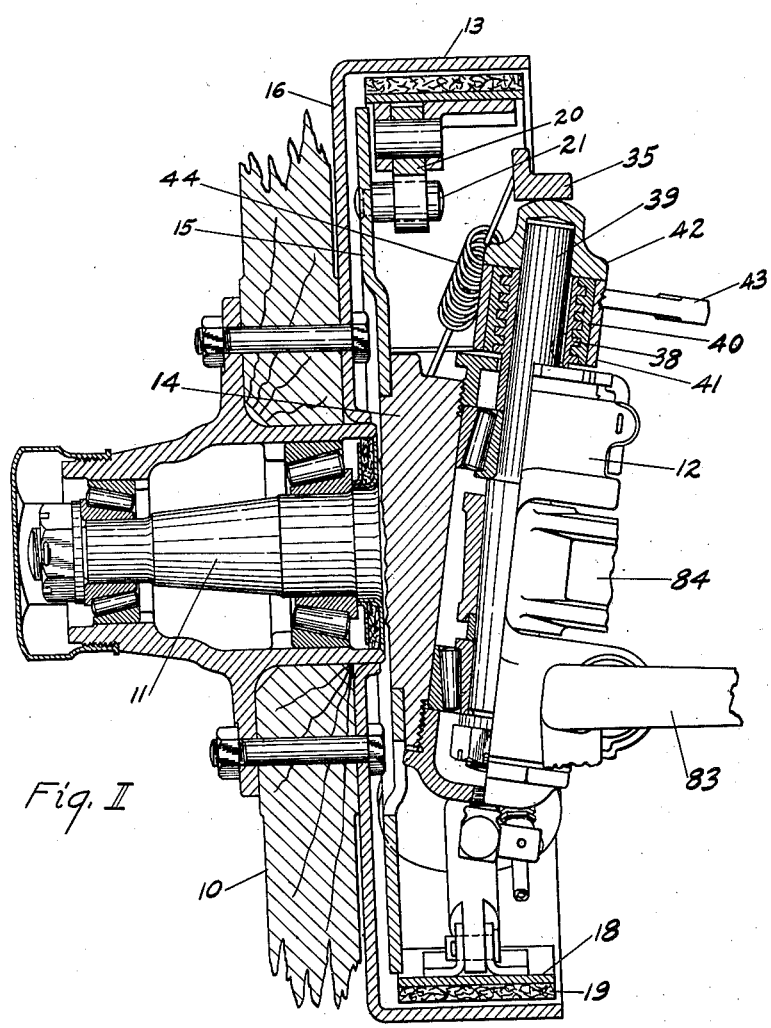
Fig. I
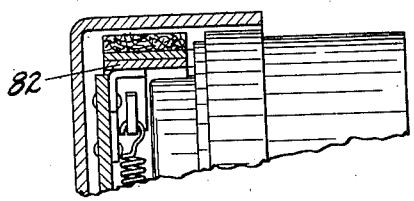
Fig. II
INVENTOR.
Ward Decker
BY Solon J. Boughton
ATTORNEY.

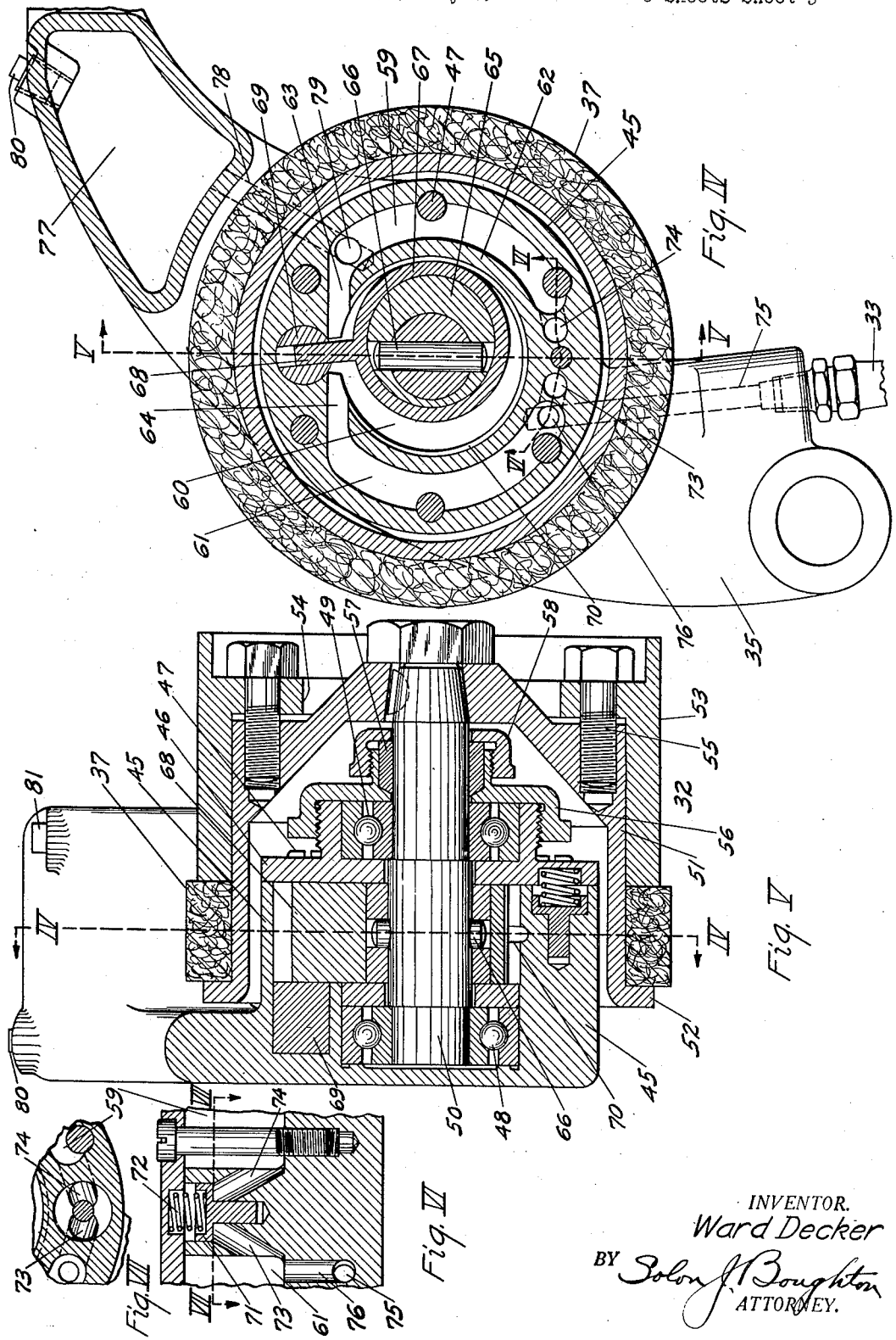

Patented Dec. 14, 1926.

1,610,755

UNITED STATES PATENT OFFICE.

WARD DECKER, OF TOLEDO, OHIO, ASSIGNOR TO THE WILLYS-OVERLAND COMPANY, OF TOLEDO, OHIO, A CORPORATION OF OHIO.

BRAKE FOR AUTOMOTIVE VEHICLES.

Application filed May 29, 1924. Serial No. 716,669.

This invention relates to brakes for automotive vehicles, and has for its object to provide an improved wheel brake, the operation of which is effected by the wheel itself under certain predetermined conditions.

A further object of the invention is to provide a hydraulic wheel brake so designed as not to become effective while the vehicle is moving at relatively low speeds, as when it is slowed down in order to safely turn corners or change its course of direction.

Another object of the invention is to provide a wheel brake constructed in such a manner as to be actuated by the wheel itself at certain predetermined speeds, and designed to prevent locking and skidding of the wheel, these results being accomplished by reason of the fact that the operating means, which is controlled by the speed, is rendered ineffective as soon as the speed of the wheel is retarded sufficiently to permit the brake releasing means to overcome the force utilized to apply the brake.

A further object of the invention is to provide a braking system in which the braking pressure applied to different wheels will vary in accordance with the speed of the individual wheel, and in which the action of each wheel brake of the system is independent of that of the others, whereby the use of an equalizing mechanism is made unnecessary.

Another object of the invention is to provide a hydraulic wheel brake in which the brake band is moved into engagement with the drum through pressure produced by a pump, including a revoluble member adapted to be driven by the drum at the will of the operator.

A further object of the invention is to provide a simple and inexpensive system of wheel brakes particularly adapted for use on the front or steering wheels of a motor vehicle, and arranged for connection with the control means for the rear wheel brakes, so that the two sets of brakes can be operated without requiring additional control means for either set.

Other objects will appear from the description to follow, covering certain embodiments of the invention, which, for the purposes of the present application, I have illustrated in the accompanying drawings, in which:

Figure I is a view in elevation and partly in section, of a brake drum and brake mechanism therein, embodying one form of the invention.

Fig. II is a sectional elevation taken on line II—II of Fig. I.

Fig. III is a detailed section taken on line III—III of Fig. I.

Fig. IV is a sectional elevation through the brake pump, taken on line IV—IV of Fig. V.

Fig. V is a transverse sectional elevation taken on line V—V of Fig. IV.

Fig. VI is a detail section through the relief valve of the pump, taken on line VI—VI of Fig. IV, and Fig. VII is a detailed section taken on line VII—VII of Fig. VI.

The present brake construction is shown in connection with a motor vehicle steering wheel 10, together with an axle or spindle 11 and a steering knuckle 12, which may be of any approved construction. Secured to the wheel is a brake drum 13, and mounted within the drum upon the head 14 of the spindle is a vertically disposed disc or plate 15 lying close to the vertical web portion 16 of the drum and secured to said head by the rivets 17, as shown in Fig. I.

A braking element is mounted within the drum, preferably comprising a brake band including the metal portion 18 and the lining 19 thereon. The band is supported intermediate its ends by a link 20 having one end pivoted thereto and the other pivotally connected with a stud 21 secured to the disc 15, as shown in Figs. I and II, said link permitting movement of the band toward and from the drum when the brakes are applied and released.

Disposed between the ends of the band is an expansible mechanism, preferably comprising a cylinder 22 and piston 23 therein, the cylinder being carried by an arm 24 pivotally connected with the lower end of the band at 25, while another arm extends from the piston and is pivotally connected to the opposite end of the band at 27.

To prevent leakage of the braking fluid from the cylinder, an expansible tube or closure 28 is mounted therein for receiving the brake fluid. The lower end of the expansible tubing is connected to the cylinder head in a manner to afford a liquid-tight joint, while its opposite end is sealed by a plate 29 connected with the end wall 30 of the piston. The expansible liquid holding closure 28 is sufficiently flexible to permit of its proper expansion by the pressure of the liquid therein when said pressure is increased to the desired amount, and its inherent resiliency causes it to assume normal position, upon relief of the pressure therein. Its return to normal position may be assisted, however, by a spring 31 having its opposite ends connected with the end portions of the brake band and adapted to release the band when the pressure is relieved in the cylinder.

Sufficient pressure within the cylinder to effect application of the brake is produced preferably by a pump, indicated generally at 32 and connected with the cylinder by a tube 33, which may have a bend or coil 34 sufficiently yieldable to permit of a slight relative movement between the cylinder and pump.

The pump is mounted on an arm or bracket 35, the lower end of which is pivoted on a stud 36 suitably secured to the disc 15. The wheel 37 of the pump, by which the latter is operated, is rotatably mounted upon the arm 35, and it is only necessary to move the arm a slight amount to cause the wheel to engage the inner periphery of the brake drum, by which the pump is driven, whereby the pressure in the brake cylinder is increased in order to effect application of the brake.

Movement of the arm to cause the pump wheel to engage the drum, may be effected by any suitable means, but preferably by a camming device mounted on top of the steering knuckle. This device comprises a threaded member 38 rigid on the upper end of the steering knuckle pivot pin 39 and having a nut 40 threaded to correspond to the threads of the member 38, said threads being inclined at a relatively steep angle, in order to more quickly produce the desired movement of the pump by the camming action of the nut 40. The nut is surrounded by a sleeve 41 rigidly connected thereto, so that upon turning the sleeve, the nut is also turned. A cap 42 is made to slide vertically on top of the pivot pin 39 by the cam and is adapted to engage the under-side of the free end of the pump supporting arm 35. Upon rotation of the nut 40 and sleeve 41, as by means of a handle 43, the cap 42 is raised, and thus the peripheral portion 37 of the pump wheel is moved into engagement with the drum, by which the pump is driven, as stated above. A spring 44, as shown in Fig. I, serves to withdraw the wheel from engagement with the drum as soon as the operator releases the controlling means (not shown) for the handle 43.

The pump, as best shown in Figs. IV to VII inclusive, comprises a casing 45 preferably cast integral with the arm 35 and having a removable cover 46 secured thereto by the studs 47. The casing and cover are preferably provided with bearings 48 and 49 respectively, adapted to support a shaft 50, on the outer end of which is keyed a cup-shaped member 51 forming a part of the pump wheel and surrounding the pump proper, as shown in Fig. V. Mounted on the cup-shaped member is the tread-portion 37 of the wheel, which is adapted for engagement with the brake drum to effect rotation of the pump when the brakes are to be applied, said portion preferably comprising a fiber or non-metallic ring constructed of any desired material. The ring is clamped upon a flange 52 of the cup-shaped member 51 by means of a sleeve 53, having an inwardly extending flange 54 through which studs 55 are projected, the latter being screwed into the cup-shaped member to hold the sleeve thereon. The bearing 49 is held in position by a screw-cap 56 threaded on the cover 46, as shown in Fig. V, the screw-cap being provided with a packing-ring 57 surrounding the shaft 50 to prevent the leakage of oil from the pump, said packing-ring being held in position by a removable cap 58 threaded upon the cap 56.

The pump casing is provided with a supply chamber 59, a pumping chamber 60 and a pressure chamber 61, the pump chamber being formed by an annular wall 62 cut away at its upper side to provide inlet and outlet passages 63 and 64 leading from the supply to the pump chamber, and from the pump to the pressure chamber, respectively. The shaft 50 extends through the pump chamber and is provided with an eccentric 65 held thereon by a key 66, the eccentric being disposed within and adapted to actuate a pump sleeve 67, which is provided at its upper side with a lateral extension 68 slidable in one end of a bearing 69, the other end of which is journaled in a recessed portion of the casing, as shown in Fig. V, said extension preventing the flow of oil directly from the passage 63 to the passage 64. Rotation of the shaft 50 by the wheel 37, through contact of the latter with the revolving brake drum, causes the pump sleeve to travel within the pump chamber in a clock-wise direction, as viewed in Fig. IV, and to force out the oil accumulating therein, discharging it into the compression chamber 61, whereby to raise the pressure within the cylinder 22 to move the piston outwardly and apply the brake.

It will be understood that the several chambers and passages of the pumping system are kept substantially filled with oil or any other suitable liquid, and that rotation of the pump at the proper speed, serves to increase the pressure within the cylinder sufficiently to expand the piston whereby to force the brake band into engagement with the brake drum. In this connection, it is preferred not to have the brake applied at relatively low speeds, and to accomplish this result, a groove 70 is provided on the inner face of the wall 62 of the pump chamber, which is of a size or capacity to permit the oil to escape back to the chamber 59 at a rate to prevent the building up of sufficient pressure within the brake cylinder to effect application of the brake when the vehicle is moving at said relatively low speed. The speed at which the brakes will be applied, can be predetermined, and the capacity of the groove made to correspond thereto, or its size regulated or made variable by any suitable adjusting means (not shown), which may be provided for the purpose.

In order to prevent the pressure in the system from becoming excessive and causing the band to grip the drum too tightly, a relief valve 71 is provided between the compression chamber 61 and the supply chamber 59, so that at a predetermined pressure in the system, the valve will open and allow a portion of the oil to escape back into the supply chamber. This valve is normally held seated by a spring 72 of the desired capacity, which is held in engagement with the valve by the pump casing cover 46. The valve normally closes the two passages 73 and 74 shown in Fig. VI, which are adapted to establish communication between the supply chamber 59 and pressure chamber 61 when the valve is opened by the excessive pressure in the last-mentioned chamber.

Communication between the compression chamber 61 and the pipe 33 leading to the cylinder 22, is established by the vertically and horizontally extending passages 75 and 76 respectively, shown in Figs. IV and VI.

The oil supply source for the system comprises a tank 77 preferably located on and cast integral with the pump supporting arm 35, but which may be separate therefrom, if desired, and located at any suitable point with respect thereto. A vertically disposed outlet passage 78 leads from the bottom of the tank to a horizontally extending passage 79 adapted to discharge into the pump supply chamber 59 as shown in Fig. IV. The passage 78 is drilled by a tool inserted through a passage in the upper wall of the tank, which is closed by a plug 80. The tank is filled through an opening normally closed by a removable plug 81, disposed at the side of the tank farthest from the brake drum, in order to render it as accessible as possible.

At the point where the fiber or non-metallic ring 37 of the pump wheel is made to engage the drum, the brake band is cut away as indicated in Figs. I and III and a reinforcing plate 82 is disposed on the inner face of the band and rigidly connected therewith by any suitable means.

Operation of the steering knuckle, as by means of the arm 83, will have no effect on the brake, since the knuckle pivot pin 39 is rigid with the axle 84 and therefore the cam nut 38 is held against rotation as by the key connecting it with said pivot pin.

While I have illustrated and described somewhat in detail, one embodiment of my invention, it is to be understood that this showing and description are illustrative only, and that I do not regard the invention as limited to the details of construction illustrated and described, except in so far as I have included such limitations within the terms of the following claims, in which it is my intention to claim all novelty inherent in the invention broadly, as well as specifically.

I claim as my invention:

1. In combination, a revoluble wheel, a brake drum connected thereto, a brake band for the drum, and hydraulic pressure producing means within the drum operatively connected with the band and adapted to be actuated by the drum.

2. In combination, a revoluble wheel, a brake drum connected thereto, a brake band for the drum, hydraulic pressure producing means within the drum operatively connected with the band and adapted to be actuated by the drum when brought into engagement therewith, and means by which said band operating means is moved into engagement with the drum.

3. In combination, a revoluble wheel, a brake drum thereon, a brake band for said drum, and hydraulic mechanism operatively connected with the band and adapted to be operated by the drum.

4. In combination, a revoluble wheel, a brake drum connected thereto, a brake band for the drum, normally inactive hydraulic means for actuating the band adapted to be placed in operative relation with respect to the drum, and means for moving said hydraulic means into position to be actuated by the drum.

5. In combination, a revoluble wheel, a brake drum connected thereto, a brake band for the drum, actuating means for the band, a hydraulic pump for effecting operation of said actuating means normally held at inoperative position, and means for moving said pump into position to be driven by the drum.

6. In combination, a revoluble wheel, a brake drum thereon, a brake band for said drum, expansible means operatively connected with the band, and a hydraulic pump adapted to be driven by the drum and connected with said expansible means for actuating the same.

7. In combination, a revoluble wheel, a brake drum thereon, a brake band for the drum, expansible means operatively connected with the band, and a pump operatively connected with said expansible means and including a revoluble member adapted to be driven by the drum.

8. In combination, a revoluble wheel, a brake drum thereon, a brake band for the drum, expansible means operatively connected with the band, a pump operatively connected with said expansible means and including a revoluble member adapted to be driven by the drum, and means for moving said revoluble member into engagement with the drum.

9. In combination, a revoluble wheel, a brake drum thereon, a brake band for the drum, expansible means operatively connected with the band, and a rotary pump operatively connected with said expansible means and adapted to be moved into and out of driving engagement with the drum.

10. In combination, a revoluble wheel, a brake drum thereon, a brake band for the drum, expansible means for actuating the band, a rotary pump operatively connected with said expansible means, a driving member for said pump and means for moving said driving member to engage and disengage the drum.

11. In combination, a revoluble wheel, a brake drum thereon, a brake band for the drum, expansible means for actuating the band, a rotary pump pivotally mounted with respect to the drum and having a driving member movable into and out of engagement therewith, and means for moving said driving member to engage said drum.

12. In combination, a revoluble wheel, a brake drum thereon, a brake band for the drum, expansible means for actuating the band, a rotary hydraulic pump operatively connected with said expansible means and adapted to be driven by the drum, and a liquid holding tank connected with said pump for supplying liquid thereto, whereby to effect operation of said expansible means.

13. In combination, a revoluble wheel, a brake drum thereon, a brake band for the drum, expansible means for actuating the band, and hydraulic means for supplying a fluid to said expansible means, including a rotary pump adapted to be driven by the drum.

14. In combination, a revoluble wheel, a brake drum thereon, a brake band for the drum, expansible means for actuating the band, hydraulic means for supplying a fluid to said expansible means including a rotary pump adapted to be driven by the drum and a fluid tank connected with the pump, and means for moving the pump into operative relation with respect to the drum.

15. In combination, a revoluble wheel, a brake drum thereon, a brake band for the drum, expansible means for actuating the band, hydraulic means for supplying a fluid to said expansible means including a movable member carrying a rotary pump adapted to be driven by the drum and a fluid tank in communication with the pump, and means for moving said member in position to cause the pump to engage and be driven by the drum.

16. In combination, a revoluble wheel, a brake drum thereon, a brake band for the drum, expansible means for actuating the band, a rotary pump operatively connected with the expansible means and movable into driving engagement with the drum, and a cam mechanism for moving the pump to engage the drum.

17. In combination, a revoluble wheel, a drum thereon, a brake band for the drum, expansible means for actuating the band, a normally inactive rotary pump operatively connected with the expansible means and movable into driving engagement with the drum, a cam mechanism for moving the pump to cause it to engage the drum, and means for returning the pump to normal position.

18. In combination, a steering wheel and an axle and a steering knuckle, of a brake drum connected to the wheel, a brake band for the drum, supporting means for the band carried by the axle, expansible means for actuating the band, and a pump operatively connected with said expansible means and adapted to be driven by the drum.

19. In combination, a steering wheel and an axle and a steering knuckle, of a brake drum connected to the wheel, a brake band for the drum, supporting means for the band carried by the axle, expansible means for actuating the band, a pump operatively connected with said expansible means and movable into driving engagement with the drum, and means for moving the pump to cause it to engage the drum.

20. In combination, a steering wheel and an axle and a steering knuckle, of a brake drum connected to the wheel, a brake band for the drum, supporting means for the band carried by the axle, expansible means for actuating the band, a pump operatively connected with said expansible means, and means carried by the steering knuckle for moving the pump to cause it to engage the drum.

21. In combination, a steering wheel and an axle and a steering knuckle, of a brake drum upon the wheel, a brake band for the drum, supporting means for the band carried by the axle, a cylinder and piston therein operatively connected with the band, a pump connected with the cylinder and adapted to be driven by the drum, and a cam mechanism mounted upon the steering knuckle and adapted to move the pump into operative relation with respect to the drum.

22. In combination, a revoluble wheel, a drum thereon, a braking element for the drum, expansible means for moving said element into engagement with the drum, an arm pivotally mounted with respect to the drum, a pump including a driving member therefor carried by the arm, said pump being operatively connected with said expansible means, and means for moving the arm to cause said driving member to be moved into driving engagement with the drum.

23. In combination, a revoluble wheel, a drum thereon, a braking element for the drum, expansible means for moving said element into engagement with the drum, an arm pivotally mounted with respect to the drum, a pump including a driving member therefor carried by the arm, a flexible tube connecting the pump with said expansible means, and means for moving the arm to cause said driving member to be moved into driving engagement with the drum.

24. In combination, a revoluble wheel, a brake drum thereon, a braking element for the drum, expansible means for moving said element into engagement with the drum, hydraulic means operatively connected with said expansible means including a revoluble cup-shaped member adapted to be driven by the drum, and a pressure producing device operatively connected with said expansible means and located within and driven by said cup-shaped member.

25. In combination, a revoluble wheel, a brake drum thereon, a braking element for the drum, expansible means for moving said element into engagement with the drum, hydraulic means operatively connected with said expansible means including a revoluble cup-shaped member adapted to be driven by the drum, a pressure producing device operatively connected with said expansible means and located within and driven by said cup-shaped member, and means for controlling the pressure produced by said pressure producing device.

26. In combination, a revoluble wheel, a brake drum thereon, a braking element for the drum, expansible means for moving said element into engagement with the drum, hydraulic means operatively connected with said expansible means including a revoluble member adapted to be driven by the drum, together with a shaft driven by said member, and a displacer upon the shaft mounted within a fluid chamber connected with said expansible means.

27. In combination, a revoluble wheel, a brake drum thereon, a braking element for the drum, expansible means for moving said element into engagement with the drum, hydraulic means operatively connected with said expansible means including a revoluble cup-shaped member adapted to be driven by the drum, together with a shaft for supporting said member, and a pressure producing device connected with said expansible means and driven by said shaft.

28. In combination, an axle, a revoluble wheel thereon, a brake drum upon the wheel, a support upon the axle, a braking element for the drum carried by said support, expansible means for moving said element into engagement with the drum, an arm pivoted upon said support, a shaft journaled upon said arm, a wheel carried by said shaft, means actuated by said shaft adapted to operate said expansible means, and means for moving the arm to cause said wheel to engage the drum.

29. In combination, an axle, a revoluble wheel thereon, a brake drum upon the wheel, a support upon the axle, a braking element for the drum carried by said support, an arm pivoted upon said support, a shaft journaled upon said arm, a wheel carried by said shaft, means actuated by said shaft adapted to operate said brake element, and means for moving the arm to cause said wheel to engage the drum.

30. In combination, an axle, a revoluble wheel thereon, a brake drum upon the wheel, a support upon the axle, a braking element for the drum carried by said support, an arm pivoted upon said support, a shaft journaled upon said arm, a wheel carried by said shaft, hydraulic means operatively connected with said brake element and adapted to be actuated by said shaft, and means for moving said pivoted member to cause the wheel upon said shaft to engage the drum.

31. In combination, an axle, a revoluble wheel thereon, a brake drum upon the wheel, a support upon the axle, a braking element for the drum carried by said support, a shiftable device upon the support including a bracket and a shaft journaled thereon carrying a wheel adapted to be driven by the the drum with means actuated by the shaft for effecting operation of said braking element, and means for moving said device to cause the wheel to move into position to be actuated by the drum.

32. In combination, an axle, a revoluble wheel thereon, a brake drum upon the wheel, a support upon the axle, a braking element for the drum carried by said support, a shiftable device upon the support including a bracket and a shaft journaled thereon carrying a wheel adapted to be driven by the drum, hydraulic means operatively connected with said braking element and adapted to be actuated by said shaft, and means for moving said device to cause the wheel to move into position to be actuated by the drum.

In testimony whereof, I affix my signature.

WARD DECKER.